(12) United States Patent
Hayter

(10) Patent No.: US 9,976,391 B2
(45) Date of Patent: May 22, 2018

(54) MANUFACTURING METHOD AND APPARATUS FOR A COLLET ASSEMBLY WITH CONGRUENT CORNERS

(71) Applicant: BAKER HUGHES INCORPORATED, Houston, TX (US)

(72) Inventor: Steven R. Hayter, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 617 days.

(21) Appl. No.: 14/465,296

(22) Filed: Aug. 21, 2014

(65) Prior Publication Data

US 2016/0053586 A1 Feb. 25, 2016

(51) Int. Cl.
| | |
|---|---|
| *E21B 41/00* | (2006.01) |
| *B23H 9/00* | (2006.01) |
| *E21B 23/00* | (2006.01) |
| *E21B 17/06* | (2006.01) |
| *E21B 34/14* | (2006.01) |
| *B23H 7/02* | (2006.01) |
| *B23H 1/00* | (2006.01) |

(52) U.S. Cl.
CPC ............. *E21B 41/00* (2013.01); *B23H 9/00* (2013.01); *E21B 17/06* (2013.01); *E21B 23/00* (2013.01); *E21B 34/14* (2013.01); *B23H 1/00* (2013.01); *B23H 7/02* (2013.01)

(58) Field of Classification Search
CPC .......... E21B 23/00; E21B 23/01; E21B 23/02; E21B 17/06; E21B 17/10; E21B 33/038; E21B 41/00
See application file for complete search history.

(56) References Cited

U.S. PATENT DOCUMENTS

| | | | | |
|---|---|---|---|---|
| 3,051,243 | A | | 8/1962 | Grimmer et al. |
| 3,768,562 | A | * | 10/1973 | Baker ................ E21B 34/14 166/289 |
| 3,948,322 | A | * | 4/1976 | Baker ................ E21B 33/127 166/154 |
| 4,035,011 | A | * | 7/1977 | Gazda ................ E21B 23/02 166/125 |
| 4,105,069 | A | * | 8/1978 | Baker ................ E21B 23/006 166/289 |
| 4,722,392 | A | * | 2/1988 | Proctor ............. E21B 23/006 166/217 |
| 4,880,059 | A | * | 11/1989 | Brandell ............. E21B 34/14 166/316 |

(Continued)

*Primary Examiner* — Nicole Coy
(74) *Attorney, Agent, or Firm* — Steve Rosenblatt

(57) ABSTRACT

A flexible collet on a subterranean tool has sacrificial soft components to protect seal bores through which the collets have to compress to get through. The sacrificial components can be replaced when the tool is removed to the surface. In one embodiment, threaded fasteners are used alone or with washers for height adjustment such that the heads of the fasteners which are softer than the seal bore material ride on the seal bore and take the wear. The tool can ultimately be used to latch into shifting sleeves to move such sleeves to open or close wall ports. Alternatively axial ridges with beveled profile ends can be used or rolling members such as wheels or balls can be used to keep sharp edges off the seal bore. EDM method can be used to create multiple fingers with an axial ridge profile and rounded end transitions.

9 Claims, 8 Drawing Sheets

(56) References Cited

U.S. PATENT DOCUMENTS

| | | | |
|---|---|---|---|
| 5,678,633 A | 10/1997 | Constantine, Jr. | |
| 7,993,085 B2 | 8/2011 | McClure | |
| 8,678,096 B2 | 3/2014 | Lively et al. | |
| 8,973,675 B2 * | 3/2015 | Herrera | E21B 33/038 |
| | | | 175/325.2 |

* cited by examiner

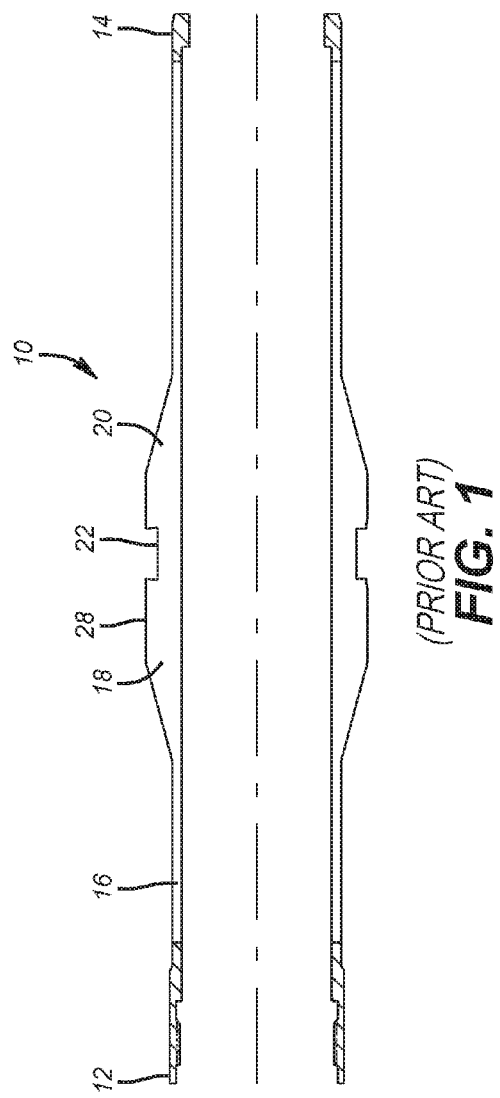
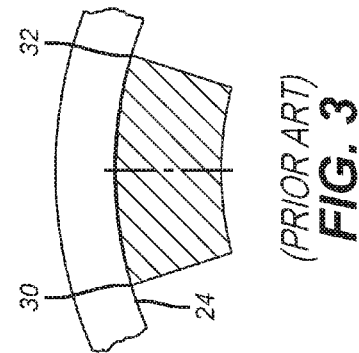
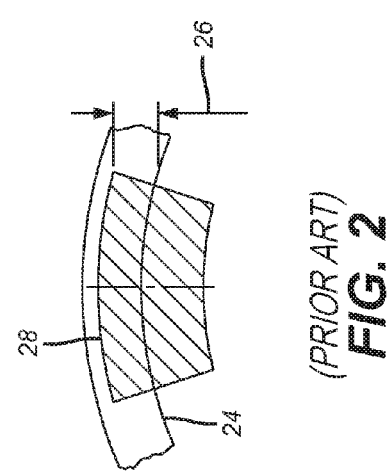

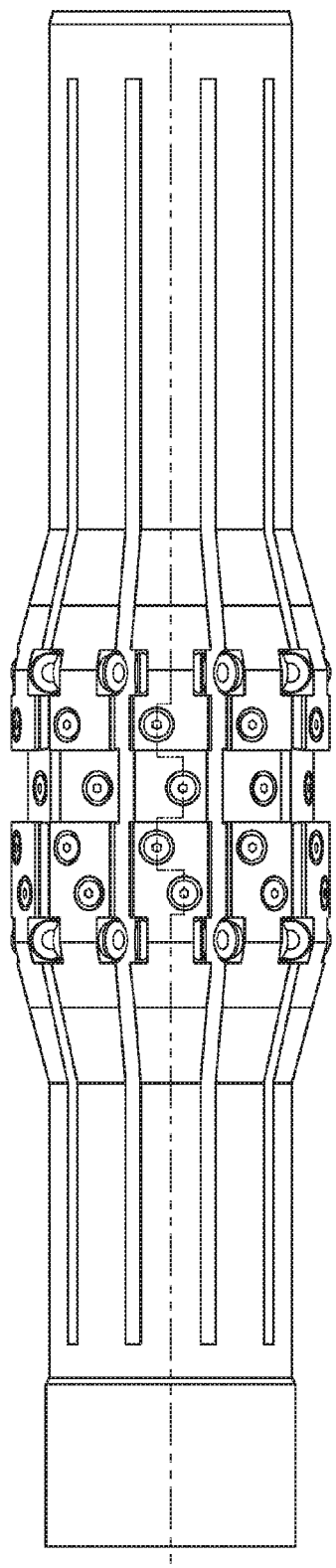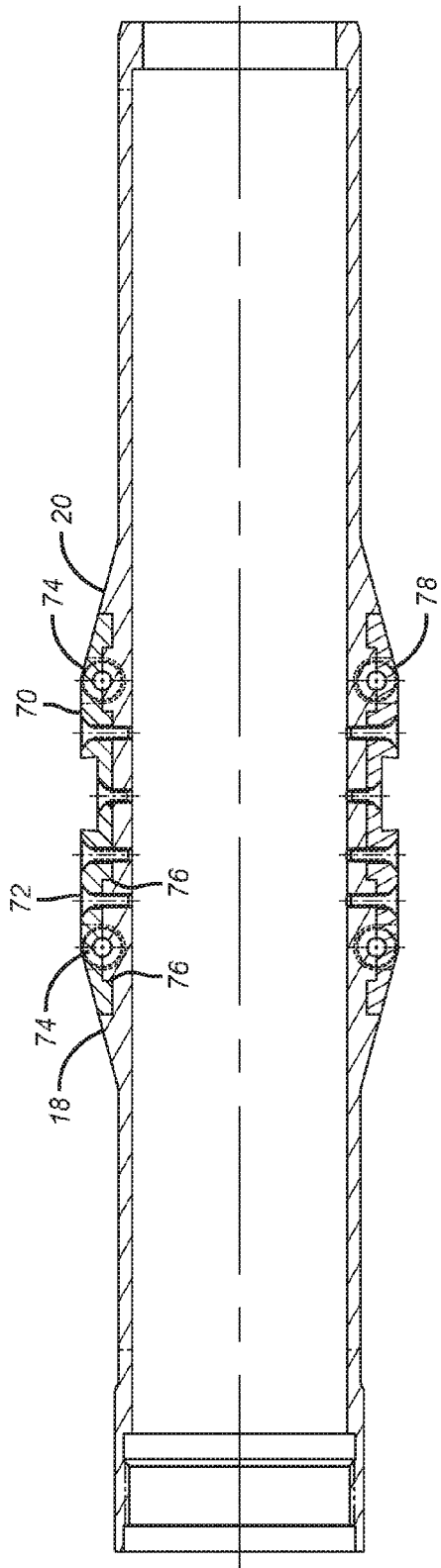

MANUFACTURING METHOD AND APPARATUS FOR A COLLET ASSEMBLY WITH CONGRUENT CORNERS

FIELD OF THE INVENTION

The field of the invention is collets used in shifting tool applications and more particularly design features on such collets that allow them to be advanced through seal bores without marring the seal bores.

BACKGROUND OF THE INVENTION

A common method of moving downhole sleeves from an opened to closed position, or vice versa, is to use a shifting tool that is attached to the bottom of a work string. The more complicated shifting tools are hydraulically actuated. In those type tools, the latching mechanism is kept in a retracted position until shifting tool has reached the sleeve. The latching mechanism is then expanded, typically by fluid flow down the work string. Other shifting tools consist of a pair of spring-loaded opposing keys. The keys have a profile designed to seek out a mating internal profile on the sleeve. These tools are capable of passing other internal profiles in the tubing, but may be prone to fouling should debris work its way beneath the keys to obstruct their inward movement. A simpler shifting tool, that may be less likely to foul in debris-laden fluids, consists of a collet (similar shape as a bow-spring centralizer) with a profile also designed to engage a mating profile in the sleeve. For all of these shifting tool designs, translation of the work string while the shifting tool is engaged with the sleeve provides the opening or closing stroke for the sleeve. The present invention is intended for use on collet-style shifting tools. A collet is well-suited for snapping into the sleeve prior to actuation and snapping out of the sleeve after actuation due to its ability to deflect in a radial direction. In fact, the collet can be designed to successfully pass through other downhole devices with smaller inside diameters than the sleeve profile. However, a problem can occur when the shifting tool collet is asked to pass through a downhole device where the smaller bore is a sealing bore. The deflected collet fingers ride along the inside diameter of the sealing bore from end to end as the shifting tool passes through. Depending on the geometry of the collet fingers, the material types and hardnesses of the collet and seal bore, and the radial force required to deflect the fingers, the fingers can scratch or gall the seal bore impairing its ability to seal. Since the collet fingers' outside diameter is larger than the seal bore through which it is passing, each deflected finger will "ride" on its two outermost edges. Previous efforts to reduce the likelihood of damage included hand-grinding or machining a large radius on those outer edges. Those efforts have met with mixed success. Hand-ground edge breaks are inconsistent and can still leave points or ridges. Collets are typically made of heat-treated alloy to withstand the repetitive bending stresses they encounter, and even well rounded edges on a hardened steel collet finger could initiate galling when passing through seal bores of lower hardness material (e.g., 13 chrome 80K MYS). Another approach for reducing damage has been to coat the collet finger surfaces. However, since the shifting tool is a rental tool that is reused from well to well, the coating on the collet would have to be reapplied on a frequent basis as it wears during service. A third approach is to add a replacement insert of a softer material that would provide temporary protection and could be easily replaced such as a brass insert held in place by an angled groove shoulder and set screw. The downside of this particular application of that concept is that it requires wider slots between collet fingers in order to install the inserts. Consequently, contact between the collet finger and sleeve profile as well as collet finger tensile area are significantly reduced.

U.S. Pat. No. 8,678,096 shows a bow spring centralizer with particulate material on the outer surface of the bow springs to resist erosion. U.S. Pat. No. 5,678,633 shows a hydraulic shifting tool; U.S. Pat. No. 3,051,243 shows a key type shifting tool; U.S. Pat. No. 7,993,085 shows a fastener used to push out a collet for fixation purposes.

What is needed and provided by the present invention in one of its forms is a way to protect the seal bores through which the collets have to pass in a compressed state before reaching the tool that they ultimately engage for operation thereof. A sacrificial softer material is disposed to contact the seal bore wall so that if there is to be any wear, the sacrificial material wears down. The material can be removably mounted to the collet so that it can be easily replaced when the tool is removed from the borehole. Various attachment methods are contemplated as well as devices to adjust the degree of protrusion of the sacrificial material.

The sacrificial material needs to be inserted in a way that it is retained for functionality without limiting the number of fingers just to accommodate the insertion or fixation technique. For example, FIG. 19 displays a laterally inserted sacrificial member 100 into an end of a dovetailed groove 102. The issue with this design is that it limits the device to having four fingers so that the members 100 can be inserted and retained with a set screw 104. Fewer fingers means higher stresses on each finger as dimensional transitions have to be negotiated and a more limited grip on the subterranean tool such as a sliding sleeve that ultimately has to be operated.

Those skilled in the art will better understand the variations of the present invention from a review of the detailed description with the associated drawings while recognizing that the full scope of the invention is to be found in the appended claims.

SUMMARY OF THE INVENTION

A flexible collet on a subterranean tool has sacrificial soft components to protect seal bores through which the collets have to compress to get through. The sacrificial components can be replaced when the tool is removed to the surface. In one embodiment, threaded fasteners are used alone or with washers for height adjustment such that the heads of the fasteners which are softer than the seal bore material ride on the seal bore and take the wear. The tool can ultimately be used to latch into shifting sleeves to move such sleeves to open or close wall ports. Alternatively, axial ridges with beveled profile ends or rolling members such as wheels or balls can be used to keep sharp edges off the seal bore. EDM methods can be used to create multiple fingers with an axial ridge profile and rounded end transitions.

BRIEF DESCRIPTION OF THE DRAWINGS

FIG. 1 is a prior art section view of a collet sleeve showing the profile on the collet that can engage a mating profile on a tool at a subterranean location;

FIG. 2 is a section view showing the collet profile in the engaged position to a subterranean tool and graphically illustrating the amount of deflection for the collet to pass through a seal bore;

FIG. 3 is a section view of the collet when passing a seal bore showing edge contact locations where seal bore scratching is likely to occur;

FIG. 6 shows the screw heads extending radially beyond the outer face of the humps to protect the seal bore as the collet fingers flex inwardly to pass through;

FIG. 9 is an exterior view of an embodiment showing rollers or balls;

FIG. 10 is a section view through FIG. 9;

DETAILED DESCRIPTION OF THE PREFERRED EMBODIMENTS

Figure 5:
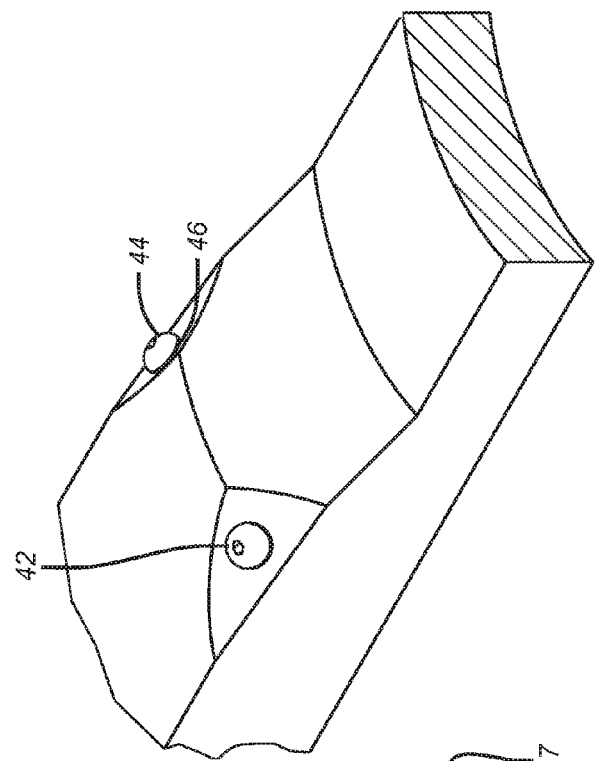
FIG. 5 is the view of FIG. 4 showing the screws in position.

FIG. 1 illustrates a flexible collet 10 of a known design. It has ring ends 12 and 14 that are supported by a tool mandrel that is not shown. Between the ring ends 14 and 12 are a plurality of finger structures 16 that are circumferentially spaced. Each of the fingers 16 has a centrally located profile shape that generally comprises opposed humps 18 and 20 that define a recess 22 in between. A subterranean tool that is not shown will have a mating profile to that shown in FIG. 1 that is formed by the humps 18 and 20 that define recess 22 in between. As shown in FIG. 2, the finger structures 16 are designed to flex to get through seal bores such as 24 and then later spring out into the mating profile of a subterranean tool that is not shown. Dimension lines 26 define the amount of radial flexing from the innermost position of the collet 10 when going through a seal bore 24 to the extended position at a later time where there is registry with a downhole tool such as a sliding sleeve for example and not by way of limitation. FIG. 2 shows the outer surface 28 of the humps 18 and 20 at its full extension when the recess 22 engages a similarly shaped projection on the subterranean tool that is not shown. FIG. 3 shows that sharp edges 30 and 32 can score the seal bore surface 24 as the collet 10 passes through it with collet 10 radially and inwardly deflected.

Figure 4:
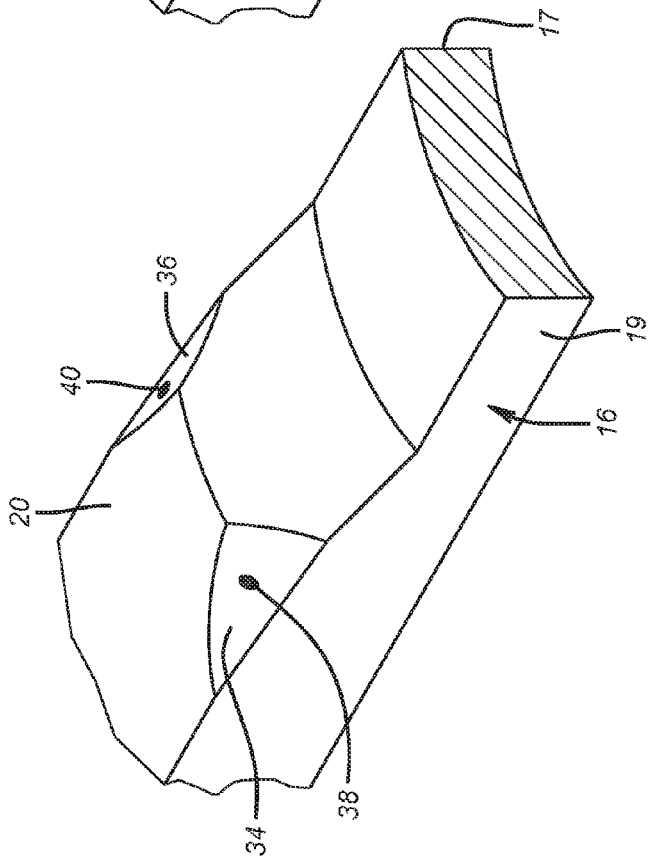
FIG. 4 is a perspective view of one embodiment showing holes to accept sacrificial screws.
Figure 6:
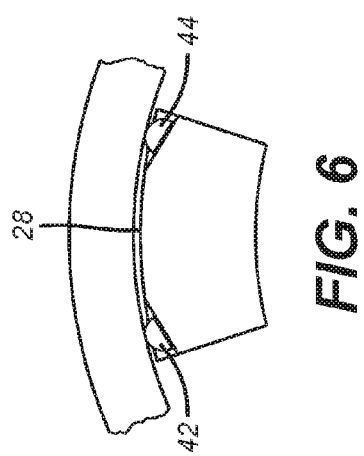

FIGS. 4-5 illustrate the machining of opposed bevels 34 and 36 on one or both of the opposed humps 18 or 20. Bores or through holes 38 and 40 are drilled or formed in beveled surfaces 34 and 36 and then tapped for a thread into which fasteners 42 and 44 can be inserted. Alternatively the fasteners 42 and 44 can be put through the outermost surface(s) 28 on either or both sides of recess 22. Depicted in FIGS. 5 and 6 are soft material cap screws with rounded heads preferably made of soft metals such as brass, bronze or copper. The heads can have a pattern to facilitate screwing them in. Alternatively, adhesives can be used instead of threads. Another alternative is an interference fit of a rod of soft material. A washer 46 can be used to adjust the height of the top of the cap screw or other shape that is used so that the radial extension of the screws 42 and 44 is beyond the outer surface 28 of the humps 18 and 20 as shown in FIG. 6. In that way the seal bore wall 24 engages the screws 42 and 44 rather than the outer surface 28 of the humps 18 and 20. The screws 42 or 44 or equivalent structures can be made of plastics, composites or other materials that are softer than the seal bore wall 24.

Figure 7:
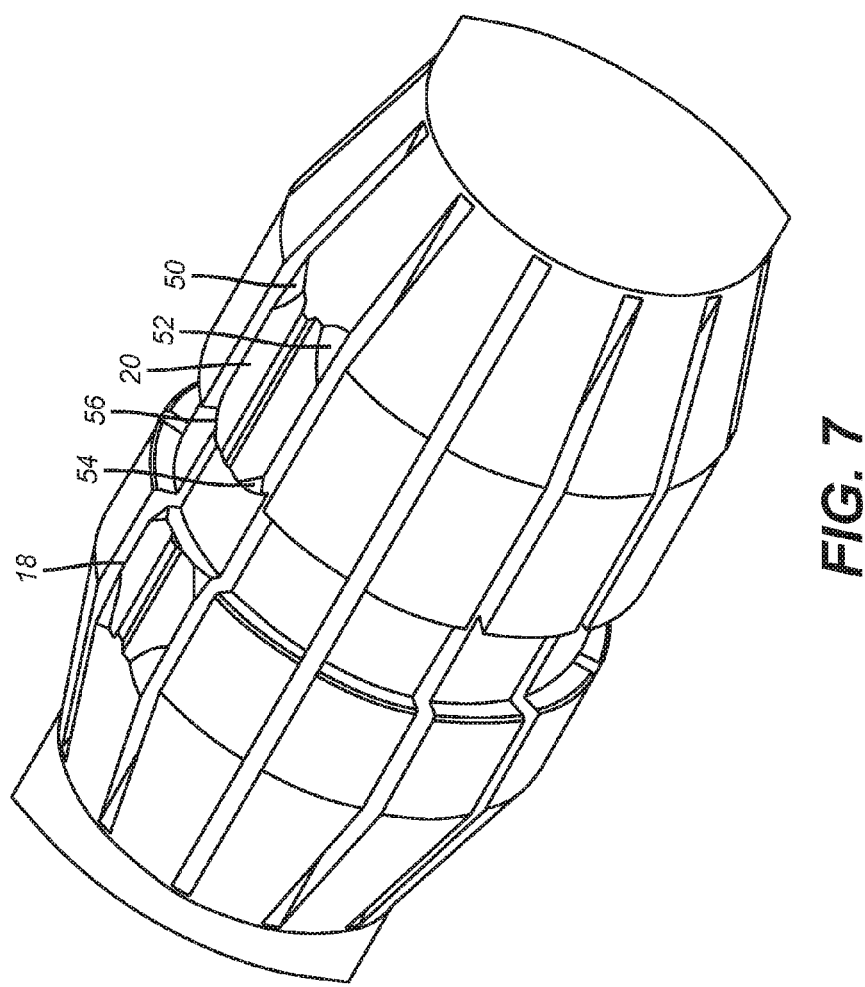
FIG. 7 is an isometric view of an alternative embodiment, shown at an intermediate stage of manufacturing, featuring leading and trailing end bevels on the humps and an axial ridge running on top of the outer surface of the humps.
Figure 8:
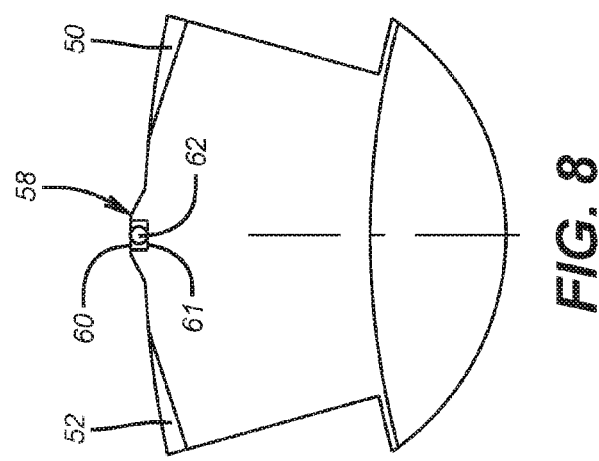
FIG. 8 is a section view through one of the humps showing the ridge and end bevels.
Figure 11:
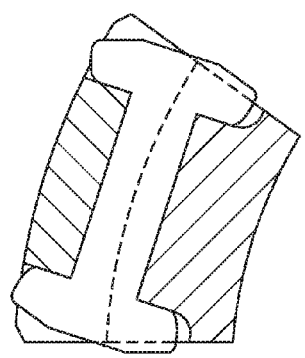
FIG. 11 shows opposed rollers connected by a shaft and disposed in non-parallel planes.

FIGS. 7 and 8 are an alternative embodiment involving machining leading and trailing bevels of about 15 degrees on humps 18 and 20 in preferably four corner locations such as 50, 52, 54 and 56 as illustrated for hump 20. While all four corners are shown to be beveled for hump 20 less than the four corners can be beveled. Hump 18 preferably has the same bevel pattern as hump 20 but they can also differ. The idea is that as the collet finger 16 flexes to get into the seal bore 24 the edge corners will be held away from the seal bore 24 and avoid contact with it that could cause damage. Working in tandem with the corner bevels are a generally axial ridge 58 that can be preferably in the middle of the finger 16. Although a single ridge is shown a plurality of ridges can also be employed. The ridge 58 can be integrated into the finger 16 structure and can have a curved outer face 60 that is contoured to the wall of the seal bore 24 or it can optionally have a sacrificial insert 62 that runs to all or part of the length of the hump 18 or 20 and can be readily removed when worn. Alternatively it can have drilled and threaded holes or grooves into which sacrificial shapes can be secured. The idea is that the ridge 58 spaces the rest of the outer surface 28 of either hump away from the seal bore wall 24. The end bevels also work in tandem with ridge 58 to ensure the leading and trailing corners such as 50-56 also clear the seal bore wall 24 as the fingers 16 begin to flex as the humps enter or leave the seal bore wall 24.

FIGS. 9-12 illustrate an alternative embodiment where the seal bore wall 24 is protected with rolling members such as wheels or balls. Specifically, rollers 74 are attached to the collet fingers 16 in strategic locations so that contact between deflected fingers 16 and restricted bores 24 occurs on the rollers. Rolling motion vs. sliding motion between the collet and the downhole tubular components will make the collet 10 less likely to scratch or gall sensitive seal bore surfaces 24. Also, wear should be reduced, resulting in a longer life expectancy. Plates 70 are attached to create the humps 18 and 20 by using fasteners 72 to hold the rollers 74 in place as shown in FIGS. 9 and 10. The plates 70 are designed with shoulders 76 so that the main brunt of a shifting force or deflecting force is directed into the collet fingers 16 rather than the fasteners 72. The fasteners 72 are attached in more than one angular orientation ("toe-nailed") to make it more difficult for an outward radial force to loosen the plates 70. The rollers 74, fasteners 72, and/or plates 70 can be replaced as needed between runs if worn or damaged during use. Collet fingers 16 may be designed to accommodate rollers 74 and plates 70 of other diameters; thus, allowing the shifting tool to be modified between runs to work on multiple sizes or inside diameters of sleeves.

Figure 12:
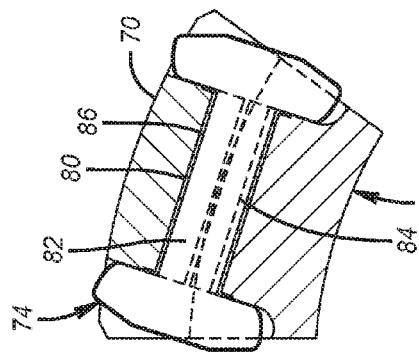
FIG. 12 is an alternative to FIG. 11 showing the use of a shaft bearing and groove to retain lubricant.

Since the rollers 74 are replaceable, they can be made out of a softer metallic material (e.g., brass) than the tubular components they will pass through. Rollers 74 could be coated with a dry film lubricant or powder coating 78 to further reduce friction with downhole tubular components. The outer surfaces of the rollers could be covered with a more spongy material such as a PEEK coating or bonded rubber, all schematically illustrated by number 78, to provide even more protection to surfaces of downhole tubular components. Rollers 74 could be made of composite materials or thermoplastics such as Nylon. As shown in FIG. 12, axles 82 and inside walls of the rollers 74; races and sidewalls of the plates 70; and races and sidewalls of the collet fingers 16 could be coated or hardened to reduce friction with one another. Replaceable split bearing sleeves 80, made of metallic, composite, or thermoplastic materials could be located around the axles 82 of the rollers 74. Bearing sleeves 82 could be designed to handle thrust loads in addition to radial loads. Bearing sleeves 80, axles 82 of rollers 74, or races of plates 70 and collet fingers 16 could be manufactured with grooves 84 to trap grease. Leaf springs (not shown) could be placed between the bearing sleeves 80 and collet fingers 16 to achieve a shock absorber effect when the rollers 74 first strike a surface. A split rubber sleeve 86 could be placed around a set of bearing sleeves 80 to achieve the same effect. The axle 82 of the roller 74 could be designed with a bulbous midsection and the bearing sleeves 80 could be designed with a mating inside surface. That would allow the roller or roller pairs 74 to rock slightly which could be of benefit if the shifting tool is forced off centerline while passing through a restricted inside diameter. Fastener 72 pattern could be varied (number of fasteners, size of fasteners—diameter or length, orientation of fasteners). Fasteners 72 could be made of any material compatible with the other shifting tool components provided they are of sufficient strength to hold the plates 70 in place. Structural adhesives could be added to the fasteners 72 to prevent loosening or to provide an additional holding force. Plates 70 could be riveted to the collet fingers 16 in lieu of using threaded fasteners. Roller 74 shape can be varied to optimize the contact area between the outer surface of the rollers 74 and the inner surface 24 of the downhole components that the shifting tool will pass. Plates 70 could be made of higher yield strength material than the collet 10 or the plates 70 could be surface-hardened to increase their wear resistance or lessen the damage sustained when shifting sleeves that are not shown. Plates 70 and collet fingers 16 could be designed to hold ball bearings in sockets instead of rollers 74 in races and the reference 74 is designed to schematically represent the use of rollers or spheres.

Figure 13:
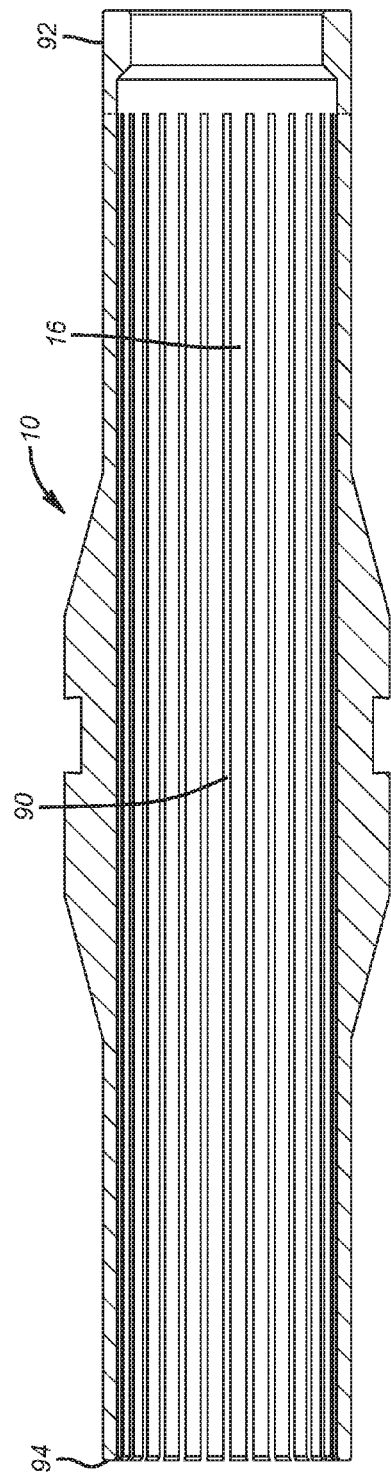
FIG. 13 is another embodiment that is produced with wire EDM cutting techniques shown in section.
Figure 15:
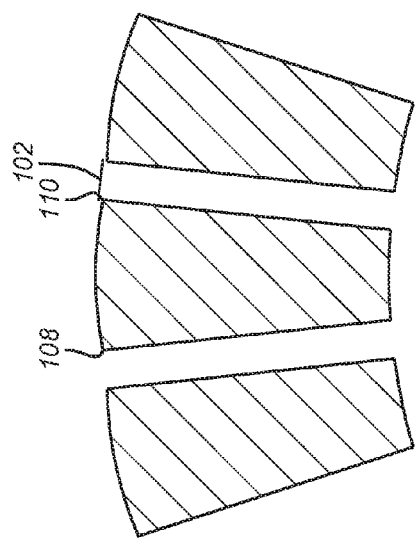
FIG. 15 is the view of FIG. 14 after through cuts are made with wire EDM showing three collet fingers.
Figure 14:
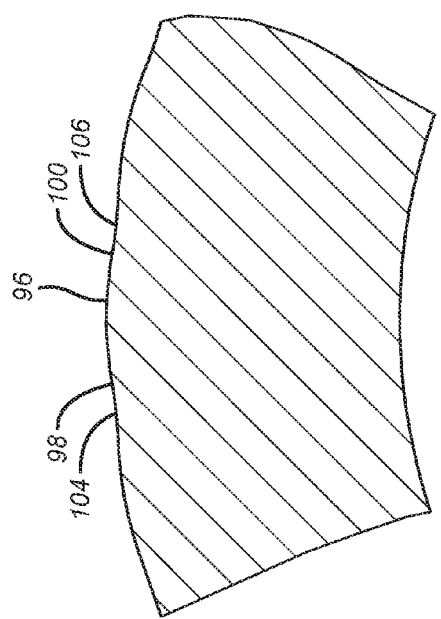
FIG. 14 is an enlarged view of the peripheral plunge profile made with plunge EDM (also known as ram EDM or die sinker EDM) before through cuts are made to create the fingers.
Figure 16:
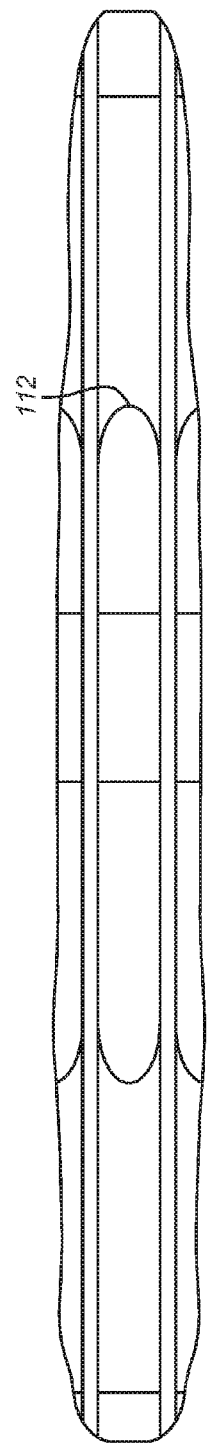
FIG. 16 shows that rounded end profiles can be created when the shapes of FIG. 14 are created.
Figure 18:
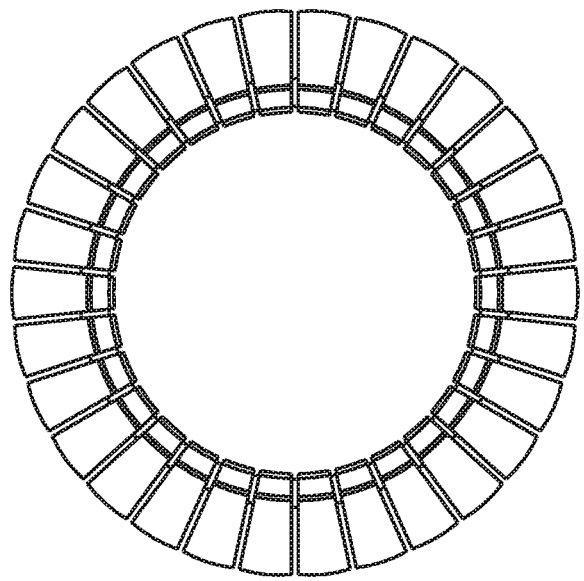
FIG. 18 is the view of FIG. 17 showing the fingers coming together such as in a seal bore before reaching the subterranean tool to be operated.
Figure 17:
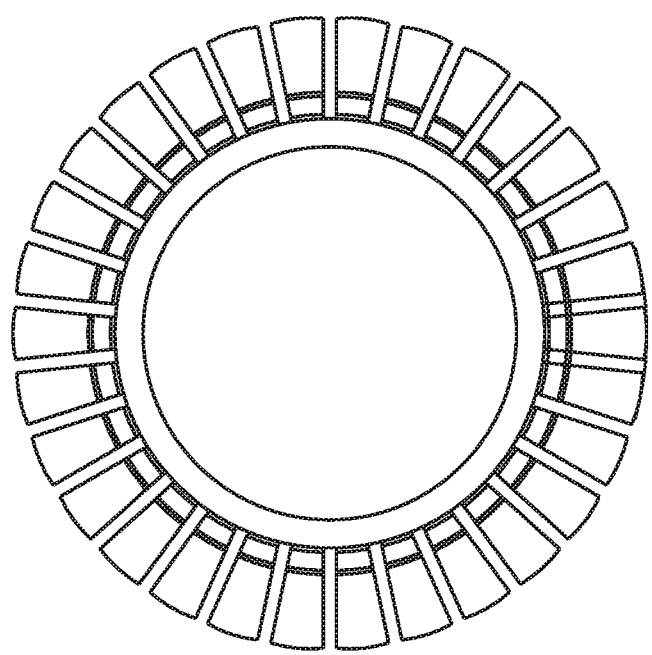
FIG. 17 is a section view of EDM cut fingers in an enlarged configuration for engagement to a subterranean tool.
Figure 19:
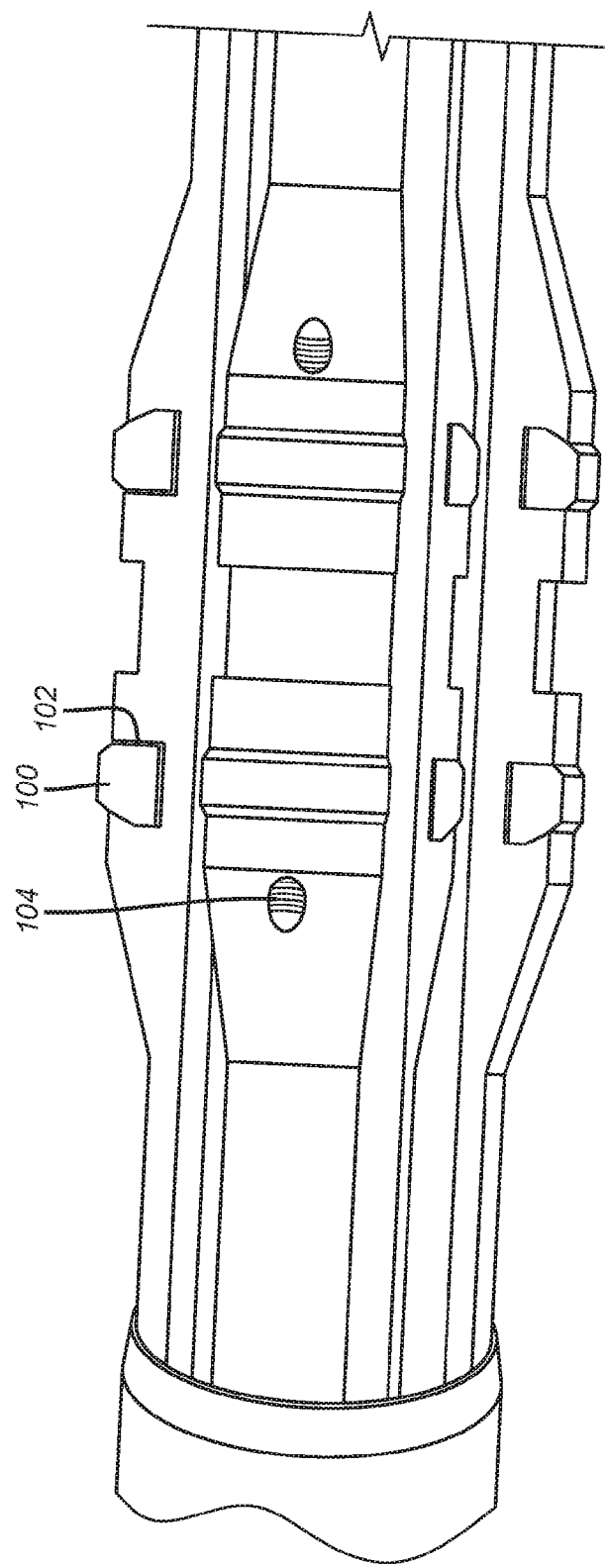
FIG. 19 is a 4 finger prior design that allows lateral insertion of sacrificial members into a dovetailed groove.

In FIGS. 13-18 a shifting collet is designed for manufacture using plunge EDM. This allows each finger 16, in its deflected position, to present a favorable profile for contact with the restricted bore through which the collet 10 is passing. Also, the axial slots 90 separating the fingers 16 are cut with wire EDM. This allows slot width between fingers 16 to be minimized so that the maximum number of fingers can be achieved. Maximizing the number of fingers 16 minimizes the contact load between each finger 16 and the restricted bore 24. These two features (favorable contact profile and increased finger count) will lessen the tendency of deflected collet fingers 16 to damage the surface of restricted bores. A section view of a collet 10 is shown in FIG. 13. In this instance, the collet 10 is shown as fixed at one end 92 and guided at the other 94; although, the concept would work on a collet fixed at both ends as well. In FIG. 14, the profile shown is intended to represent the shape of a plunge EDM electrode. The profile consists of a small radius 96 (much smaller than the large outside diameter of the collet) flanked by two small flats 98 and 100. Multiple plunges would be made around the circumference of the large outside diameter schematically represented by line 102 in FIG. 15 so that the flats 98 and 100 contact adjacent flats 104 and 106. Then, wire EDM is used to cut long slots along the axis of the collet 10 to form the fingers 16. The wire EDM cuts would essentially remove the flat parts 98 and 100 and 104 and 106 of the plunge cuts, leaving the fingers 16 with small radii 96 on their outer surfaces. As shown in FIG. 15, the corners 108 and 110 of each finger 16 would be recessed from the largest outside diameter of the resulting collet 10. The wire EDM cuts would extend through the entire part so that a pair of slots 90 (180 degrees apart) would be cut simultaneously. An end view of a collet 10 manufactured using such a method is shown in FIGS. 17 and 18. In the instance shown, there are a total of 30 fingers 16. The EDM slot width and number of fingers are designed so that there remains sufficient room between the collet fingers 16 when they are in a deflected position (See FIG. 18.). Clearance preferably remains so that debris will not obstruct radial movement of the fingers 16. Two advantages are apparent from this style of collet 16: 1) the deflected collet fingers 16 will "ride" through a restricted bore on their crown 96; no sharp edges 108 and 110 will drag through the seal bore; and, 2) the force required to deflect each finger is significantly reduced since the load is shared by 2 to 3 times the "normal" number of collet fingers 16; less surface contact force results in less surface contact stress. The plunge EDM step makes it possible to create a part with a variety of radii and shapes of the collet finger 16 profile. A profile with a smaller radius that guarantees smooth contact at the crown 96 would be preferable. The wire EDM process is preferred for cutting the axial slots 90 because of the difficulty in machining closely-spaced slots 90 by conventional milling without damaging the fingers 16. Also, the slot 90 width could be optimized since it would not have to conform to cutter width. In typical collet designs, the number of fingers is minimized to reduce manufacturing cost. The advantage of the multitude of EDM cut fingers 16 is that the contact stresses are spread over a significantly larger surface area of the Seal Bore inside diameter.

Axial cuts 90 could remove a portion of the radius of the plunge EDM profile or axial cuts 90 could leave a portion of the flat 98 and 100 of the plunge EDM profile without affecting the contact location of the fingers 16. The plunge EDM profile could vary (e.g., each finger 16 could have multiple axial ridges, further reducing contact load). Axial cuts could be made by laser or high-pressure water jet (abrasive jet). End profile of the plunge EDM cuts could be optimized to round 112 the entry surface of each finger as shown in FIG. 16.

Those skilled in the art will appreciate that the design variations offer different ways to avoid marring a seal bore with passing collet fingers that must still spring out and engage a downhole tool and move it, such as a sliding sleeve for example. FIGS. 1-6 illustrate the use of easily mounted sacrificial objects that hold sharp edges from the seal bore wall in a way that makes the sacrificial objects easy to insert and later remove for replacement without having to limit the number of fingers to accommodate the specific fixation technique. The height of the sacrificial members can also be adjusted. In an alternative technique of FIGS. 7-8 an axial ridge can be provided with or without a sacrificial insert coupled with end bevels adjacent the outermost surface of the collet profile to again keep sharp edges from touching the seal bore. FIGS. 9-12 illustrate using rolling resistance of a sacrificial component such as wheels or spheres to keep sharp edges from contacting the seal bore wall. FIGS. 13-18 show a manufacturing technique that allows for a higher finger count for a given diameter as well as an axial hump to keep sharp edges off the seal bore wall with an option of rounding transitions to the finger profile on opposed ends of the profile to ease flexing while passing through seal bores and ultimately into the profile of the tool to be operated at the subterranean location.

While the above description was written in contemplation of the shifting tool passing through a seal bore, the concepts apply when passing through any restriction with an ID that needs to be protected—such as a subterranean tool with ID seals.

The above description is illustrative of the preferred embodiment and many modifications may be made by those skilled in the art without departing from the invention whose scope is to be determined from the literal and equivalent scope of the claims below.

I claim:

1. A collet assembly for operating a subterranean tool after radially flexing to pass through a bore, comprising:
a tubular mandrel having a longitudinal axis, opposed ends and a plurality of slots between said ends to define a plurality of spaced fingers having a finger longitudinal axis generally aligned with said longitudinal axis of said mandrel, said fingers attached at opposed finger ends to said tubular mandrel, said fingers having a raised exterior segment having opposed axial edges and said raised exterior segment further comprises at least one outer surface, said raised outer surface further comprising a recess for selective engagement of the subterranean tool;
said at least one outer surface on said raised exterior segment on at least one of said fingers further comprising a plurality of spaced projections in a common plane, said plane oriented radially to said finger longitudinal axis and said plurality of spaced projections in a common plane selectively fastened to said outer surface in a generally perpendicular direction to said finger longitudinal axis, or said at least one outer surface on said raised exterior segment on said at least one of said fingers further comprising spaced axially oriented elongated projections each comprising a projection longitudinal axis extending in the direction of said finger longitudinal axis and disposed on opposed sides of said recess;
said spaced axially oriented elongated projections or said plurality of spaced projections extending higher than said at least one outer surface on said raised exterior segment when in contact with the bore to keep said opposed axial edges away from the bore, to protect the bore from being marred.

2. The assembly of claim 1, wherein:
said spaced axially oriented elongated projections is produced using EDM cutting along the length of the tubular.

3. The assembly of claim 1, wherein:
said slots are produced by EDM, water jet or laser cutting through at least one wall of said tubular mandrel.

4. The assembly of claim 1, wherein:
said spaced axially oriented elongated projections is formed with removal of material from the tubular that leaves relatively flat portions straddling said spaced axially oriented elongated projections;
said slots are produced by removal of said flat portions.

5. The assembly of claim 1, wherein:
said raised exterior segment transitions on opposed ends to an adjacent portion of each finger with a curved transition.

6. The assembly of claim 1, wherein:
said raised exterior segment transitions on opposed ends to an adjacent portion of each finger with an angular transition.

7. The assembly of claim 1, wherein:
said spaced axially oriented elongated projections further comprising a sacrificial insert in groove, with said at least one axially oriented projection further comprising a plurality of axially oriented projections aligned on all said fingers.

8. The assembly of claim 1, wherein:
said tubular mandrel comprises at least 20 slots.

9. The assembly of claim 1, wherein:
said spaced axially oriented elongated projections or said plurality of spaced projections is softer than the bore.

* * * * *